US012780220B2

(12) United States Patent
Gilbert-Eyres et al.

(10) Patent No.: US 12,780,220 B2
(45) Date of Patent: Nov. 3, 2026

(54) SMART PARKING SYSTEMS AND CONTROL LOGIC FOR VEHICLE ASSISTED OCCUPANT EGRESS

(71) Applicant: GM GLOBAL TECHNOLOGY OPERATIONS LLC, Detroit, MI (US)

(72) Inventors: Matthew E. Gilbert-Eyres, Rochester Hills, MI (US); Alec M. Wuorinen, Columbus, OH (US); Tarun Sehgal, Rochester Hills, MI (US); Russell A. Patenaude, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 10 days.

(21) Appl. No.: 19/014,655

(22) Filed: Jan. 9, 2025

(65) Prior Publication Data

US 2026/0192809 A1 Jul. 9, 2026

(51) Int. Cl.
*B60W 50/00* (2006.01)
*B60K 35/28* (2024.01)
(Continued)

(52) U.S. Cl.
CPC ......... *B60W 50/0098* (2013.01); *B60K 35/28* (2024.01); *B60N 2/0021* (2023.08);
(Continued)

(58) Field of Classification Search
CPC .............. B60K 35/28; B60K 2360/164; B60K 2360/178; B60W 50/0098; B60W 50/16; B60W 2050/143; B60W 2540/01
See application file for complete search history.

(56) References Cited

U.S. PATENT DOCUMENTS 7,761,209 B2 7/2010 Morris
8,620,549 B2 * 12/2013 Nickolaou ............. B60Q 9/008
701/70

(Continued)

FOREIGN PATENT DOCUMENTS

DE 102005014581 A1 9/2006
DE 102012021249 A1 5/2014

(Continued)

*Primary Examiner* — Anshul Sood
(74) *Attorney, Agent, or Firm* — Quinn IP Law

(57) ABSTRACT

A method of operating a host vehicle includes a vehicle controller communicating with vehicle dynamics sensors and/or vehicle control modules to determine if the host vehicle is parked; if so, the controller responsively retrieves sensor data from a vehicle sensor array to detect any open spots adjacent the lateral sides of the host vehicle. For each detected open spot, the vehicle controller determines if there is an occupant in a vehicle seat exiting the host vehicle into that open spot; if so, the controller responsively activates a distinct subset of sensor array sensors assigned to the corresponding vehicle seat. Using real-time sensor data received from the subset of sensors, the vehicle controller determines if a target vehicle is approaching the corresponding open spot; if so, the controller responsively commands a vehicle subsystem to execute a remediating action to prevent the occupant from exiting the passenger cabin into the open spot.

20 Claims, 3 Drawing Sheets

(51) Int. Cl.

| | |
|---|---|
| ***B60N 2/00*** | (2006.01) |
| ***B60W 50/14*** | (2020.01) |
| ***B60W 50/16*** | (2020.01) |

(52) U.S. Cl.

CPC ....... *B60W 50/16* (2013.01); *B60K 2360/164* (2024.01); *B60K 2360/178* (2024.01); *B60W 2050/143* (2013.01); *B60W 2050/146* (2013.01); *B60W 2420/403* (2013.01); *B60W 2420/503* (2013.01); *B60W 2520/28* (2013.01); *B60W 2540/01* (2020.02)

(56) References Cited

U.S. PATENT DOCUMENTS

| | | | | |
|---|---|---|---|---|
| 10,300,888 | B1 | 5/2019 | Gilbert-Eyres | |
| 10,407,946 | B2 * | 9/2019 | Capalau | E05B 77/54 |
| 11,225,153 | B2 | 1/2022 | Prasad | |
| 2009/0033477 | A1 * | 2/2009 | Illium | E05C 17/00<br>280/727 |
| 2017/0369016 | A1 * | 12/2017 | Gurghian | B60W 30/0956 |
| 2020/0254928 | A1 * | 8/2020 | Monteiro | B60Q 9/00 |
| 2020/0283012 | A1 * | 9/2020 | Kozak | G08G 1/166 |
| 2023/0106562 | A1 * | 4/2023 | Bozich | B60W 40/105<br>340/425.5 |
| 2023/0242106 | A1 * | 8/2023 | Naserian | E05F 15/73<br>340/435 |
| 2024/0233542 | A9 | 7/2024 | Khalid | |
| 2024/0239365 | A1 * | 7/2024 | Banerjee | E05F 15/40 |
| 2024/0339033 | A1 | 10/2024 | Chamberlin | |
| 2024/0362955 | A1 | 10/2024 | Stone | |

FOREIGN PATENT DOCUMENTS

| | | | |
|---|---|---|---|
| EP | 2020341 | A2 | 2/2009 |
| WO | 2004071815 | | 9/2006 |

* cited by examiner

SMART PARKING SYSTEMS AND CONTROL LOGIC FOR VEHICLE ASSISTED OCCUPANT EGRESS

INTRODUCTION

The present disclosure relates generally to occupant assist systems for motor vehicles. More specifically, aspects of this disclosure relate to smart parking systems for facilitating vehicle occupant egress from stopped or parked automobiles.

Current production motor vehicles, such as the modern-day automobile, are originally equipped with various compartment closure assemblies that are movably mounted to the vehicle body to provide access to the vehicle's interior compartments. Driver-side and passenger-side vehicle doors, for example, can be opened and closed to allow user access for entering (ingress to) and exiting (egress from) the passenger cabin. Vehicle door assemblies are oftentimes equipped with a locking mechanism that is designed, for example, to prevent the door from inadvertently opening during operation of the vehicle and to inhibit unauthorized access when the vehicle is unattended. When unlocked, either manually or through an electronic interface, the door assembly may be opened for entry and egress through operation of a door handle or activation of an automated door system (e.g., a pneumatic, hydraulic, or motor-driven device for automatically opening and closing power liftgates, tailgates, side doors, etc.).

During operation of a vehicle door assembly, a foreign object may unexpectedly impact or obstruct the opening path of the door. To obviate the likelihood of damage to the vehicle and object, a power-actuated vehicle door assembly may include an "anti-pinch" switch that operates to stop or reverse the motion of the door assembly upon contact with the foreign object. While this feature serves to minimize damage to the vehicle and object, it requires that the door assembly be moving and physically contact the object before activating. As another preventative measure, some vehicles employ a proximity sensor to detect the presence of objects obstructing the path of the vehicle door assembly, and responsively disable the door assembly's automated driving system. These proximity sensor systems, however, are typically limited to detecting objects already within the path of the door assembly. In addition, both of the foregoing systems operate by regulating the automated door's driving mechanism and, thus, would not function with passenger door assemblies that are not equipped with the requisite automation hardware and software.

SUMMARY

Presented below are smart parking systems with control logic for provisioning vehicle-assisted occupant egress, methods for operating and methods for manufacturing such smart parking systems, and motor vehicles equipped with such smart parking systems. By way of non-limiting example, an infotainment system-supported vehicle egress protocol actively tracks a subject "host" vehicle's wheel speed sensors and powertrain control module to determine when the vehicle is idling, shifted into park, or keyed off (collectively "parked"). When parked, the vehicle infotainment system evaluates external sensor data to identify open parking spots on port and starboard sides of the vehicle and concomitantly maps vehicle occupancy to determine if an occupant is located in a seat that exits into one of the open parking spots, if any. For each occupied vehicle seat that alights into an open parking spot ("risk-prone spot"), the vehicle activates a respective subset of the vehicle's vehicle sensor array sensors to identify and track a third-party "target" vehicle approaching the risk-prone spot. Detection of a target vehicle approaching a risk-prone parking spot ("risk-laden spot") triggers an egress probability evaluation to predict the likelihood that the occupant will egress into that parking spot while the target vehicle breaches the spot. If the probability of egress exceeds a predefined egress threshold, the vehicle infotainment system responsively activates a remediation protocol to warn the occupant and/or actively prevent the occupant from exiting the vehicle.

Aspects of this disclosure are directed to methods for making and methods for using any of the herein described motor vehicles and/or smart vehicle parking systems. In an example, a method is presented for operating a host vehicle. The host vehicle has a vehicle body with a passenger cabin containing driver-side (first) and passenger-side (second) vehicle seats accessed through respective driver-side (first) and passenger-side (second) vehicle door assemblies. This representative method includes, in any order and in any combination with any of the above and below disclosed options and features: determining, e.g., by a resident or remote microprocessor, central controller, programmable logic device, control module, or network of controllers/processors/modules/devices/etc. (collectively "vehicle controller") using real-time vehicle data received from a vehicle dynamics sensor (e.g., wheel speed sensor, brake pressure sensor, accelerometer, etc.) and/or a vehicle control module (e.g., Powertrain Control Module (PCM), Engine Control Module (ECM), Motor Control Module (MCM), etc.), whether or not the host vehicle is parked; determining, e.g., via the vehicle controller using real-time sensor data received from a resident vehicle sensor array responsive to determining the host vehicle is parked, whether or not there is an open spot adjacent one or both lateral sides of the host vehicle; detecting, e.g., via the vehicle controller for each detected open spot, an occupant seated in the corresponding vehicle seat that exits the host vehicle through a respective vehicle door into that open spot; activating, e.g., via the vehicle controller responsive to detecting an occupant in the corresponding vehicle seat exiting into the open spot, a select subset of sensors of the vehicle sensor array assigned to that vehicle seat; detecting, e.g., via the vehicle controller using real-time sensor data received from the select subset of sensors, a target vehicle approaching the open spot; and commanding, e.g., via the vehicle controller responsive to detecting the target vehicle approaching the open spot, one or more resident vehicle subsystems to execute one or more remediating actions designed to prevent the occupant from exiting the passenger cabin into the open spot.

Aspects of this disclosure are also directed to computer-readable media (CRM) containing controller-executable instructions for provisioning vehicle-assisted occupant egress. In an example, a non-transient CRM stores instructions that are executable by a vehicle controller of a host vehicle. The host vehicle includes a passenger cabin that contains first and second vehicle seats accessed through respective first and second vehicle doors. These CRM-stored instructions, when executed, cause the vehicle controller to perform operations that include: determining, using vehicle data received from a vehicle dynamics sensor and/or a vehicle control module, the host vehicle is parked; detecting, using sensor array data received from a vehicle sensor array of the host vehicle responsive to determining the host vehicle is parked, a first open spot adjacent a first lateral side of the host vehicle and/or a second open spot adjacent a second lateral side of the host vehicle; detecting a first occupant in the first vehicle seat exiting the host vehicle through the first vehicle door into the first open spot and/or a second occupant in the second vehicle seat exiting the host vehicle through the second vehicle door into the second open spot; activating, via the vehicle controller responsive to detecting the first occupant in the first vehicle seat and/or the second occupant in the second vehicle seat, a first subset of sensors of the vehicle sensor array assigned to the first vehicle seat and/or a second subset of sensors of the vehicle sensor array assigned to the second vehicle seat; detecting, via the vehicle controller using first sensor data received from the first subset of sensors and/or second sensor data received from the second subset of sensors, a first target vehicle approaching the first open spot and/or a second target vehicle approaching the second open spot; and commanding, via the vehicle controller responsive to detecting the first target vehicle approaching the first open spot and/or the second target vehicle approaching the second open spot, a resident vehicle subsystem of the host vehicle to execute a remediating action configured to prevent the first occupant from exiting the passenger cabin into the first open spot and/or prevent the second occupant from exiting the passenger cabin into the second open spot.

Additional aspects of this disclosure are directed to motor vehicles equipped with smart parking systems for providing vehicle-assisted occupant egress. As used herein, the terms "vehicle" and "motor vehicle" may be used interchangeably and synonymously to include any relevant vehicle platform, such as passenger vehicles, commercial vehicles, industrial vehicles, off-road and all-terrain vehicles, tracked vehicles, farm equipment, motorcycles, etc. In an example, a motor vehicle includes a vehicle body with a passenger cabin, multiple road wheels attached to the vehicle body (e.g., via corner modules coupled to a unibody or body-on-frame chassis), and other standard original equipment. A prime mover, which may be in the nature of an electric traction motor and/or an internal combustion engine (ICE) assembly, is located inside the vehicle body and drives the road wheel(s) to propel the vehicle. The vehicle also includes one or more vehicle seats located inside the passenger cabin, and one or more vehicle doors movably mounted to the vehicle body to selectively open and thereby provide access to the vehicle seat(s).

Continuing with the discussion of the foregoing example, the vehicle is also equipped with a resident or remote vehicle controller that is programmed to communicate with one or more vehicle dynamics sensor and/or one or more vehicle control modules to determine if the subject vehicle is parked; if so, the controller communicates with a resident vehicle sensor array to detect if there is an open spot adjacent a lateral side of the vehicle. For each detected open spot, the controller determines if there is an occupant in the vehicle seat that exits through a respective vehicle door into that open spot; if so, the controller responsively activates a subset of sensors in the vehicle sensor array assigned to that vehicle seat. Using real-time sensor data received from the subset of sensors, the controller identifies and tracks a target vehicle approaching the open spot. Responsive to detecting a target vehicle approaching an open spot adjecting an occupied vehicle seat, the controller commands at least one resident vehicle subsystem to execute at least one remediating action to prevent the occupant from exiting the passenger cabin into that open spot.

For any of the disclosed vehicles, systems, and methods, the vehicle controller may respond to the host vehicle parking by retrieving real-time sensor data from the resident vehicle sensor array to determine if there are open spots immediately adjacent both the port and starboard sides of the vehicle. Upon detecting multiple open spots, the vehicle controller responsively determines if there are one or more vehicle seats that exit the host vehicle into each open spot. Upon determining that at least one occupant is exiting the host vehicle into a detected open spot, the vehicle controller activates a distinct subset of the vehicle sensor array sensors assigned to that vehicle seat. Using real-time sensor data received from each subset of sensors, the vehicle controller determines if a target vehicle is approaching each detected open spot; if so, the controller commands one or more resident vehicle subsystems to execute one or more remediating action to prevent each occupant from exiting the passenger cabin into the detected open spot.

For any of the disclosed vehicles, systems, and methods, the vehicle controller may respond to detecting a port-side (first) open spot by communicating with a driver seat-mounted (first) pressure sensor and concomitantly analyzing pressure sensor data received therefrom to determine if the driver seat is occupied. Likewise, the vehicle controller may respond to detecting a starboard-side (second) open spot by communicating with a passenger seat-mounted pressure sensor and concomitantly analyzing pressure sensor data received therefrom to determine if that passenger seat is occupied. Similar process steps may be executed for rear driver-side and passenger-side vehicle seats. For each detected vehicle seat with an occupant, the vehicle controller may determine which of the available sensors of the vehicle sensor array corresponds to that vehicle seat. This may further necessitate determining an orientation of the host vehicle relative to the open spot(s) (e.g., nose in vs. tail in) in order to ascertain which sensors to activate for each occupied vehicle seat that exits into an open spot adjacent the parked host vehicle. The vehicle controller may also need to determine whether the host vehicle is parked in an end spot (i.e., with one laterally adjacent parking post) or an intermediate spot (i.e., with two laterally adjacent parking posts) to preclude a false-positive detection of a laterally adjacent open spot that does not exist.

For any of the disclosed vehicles, systems, and methods, the vehicle controller may predict a probability of egress indicative of a likelihood of a detected occupant exiting the host vehicle into an open spot while a target vehicle is entering that open spot. The controller then determines if the predicted probability of egress is greater than a preset threshold egress value. In this instance, the vehicle controller commands the resident vehicle subsystem(s) to execute the remediating action(s) further in response to the probability of egress being greater than the preset threshold egress value. Predicting the probability of egress may be based on a total time since the host vehicle was parked, an age of the occupant, an activity level of a location where the host vehicle is parked, and/or a behavior profile of the occupant.

For any of the disclosed vehicles, systems, and methods, the vehicle controller may respond to verifying that the host vehicle is parked by activating port-side (first) and starboard-side (second) lateral proximity or camera sensors to monitor the port (first) and starboard (second) sides of the host vehicle. The vehicle controller concurrently retrieves real-time sensor data from the lateral proximity/camera sensors to detect therefrom the open spot(s). As another option, the select subset of sensors may include a front or rear vehicle camera that captures digital images of a target vehicle as it approaches and/or enters an open spot. In this instance, an in-vehicle telematics unit may simultaneously display the captured digital images of the target vehicle approaching/entering the open spot. As yet another option, the vehicle dynamics sensor may include a wheel speed sensor that monitors real-time vehicle speed and the vehicle data indicates that the host vehicle has stopped. Additionally, the vehicle control module may include a powertrain control module that monitor real-time powertrain operating mode and the vehicle data indicates that the host vehicle has shifted into park.

For any of the disclosed vehicles, systems, and methods, the resident vehicle subsystem may include one or more haptic transducers mounted to one or more of the in-cabin vehicle seats. In this instance, the remediating action may include a haptic transducer outputting a predefined haptic alert to an occupant of a vehicle seat. As another option, the resident vehicle subsystem may include a centerstack telematics unit mounted inside the passenger cabin. In this instance, the remediating action includes the telematics unit outputting a predefined audible and/or visual alert to an occupant of a vehicle seat. As yet another option, the resident vehicle subsystem may include one or more power door locks attached to one or more of the vehicle doors. In this instance, the remediating action may include a power door lock locking a vehicle door while a target vehicle enters an open spot.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
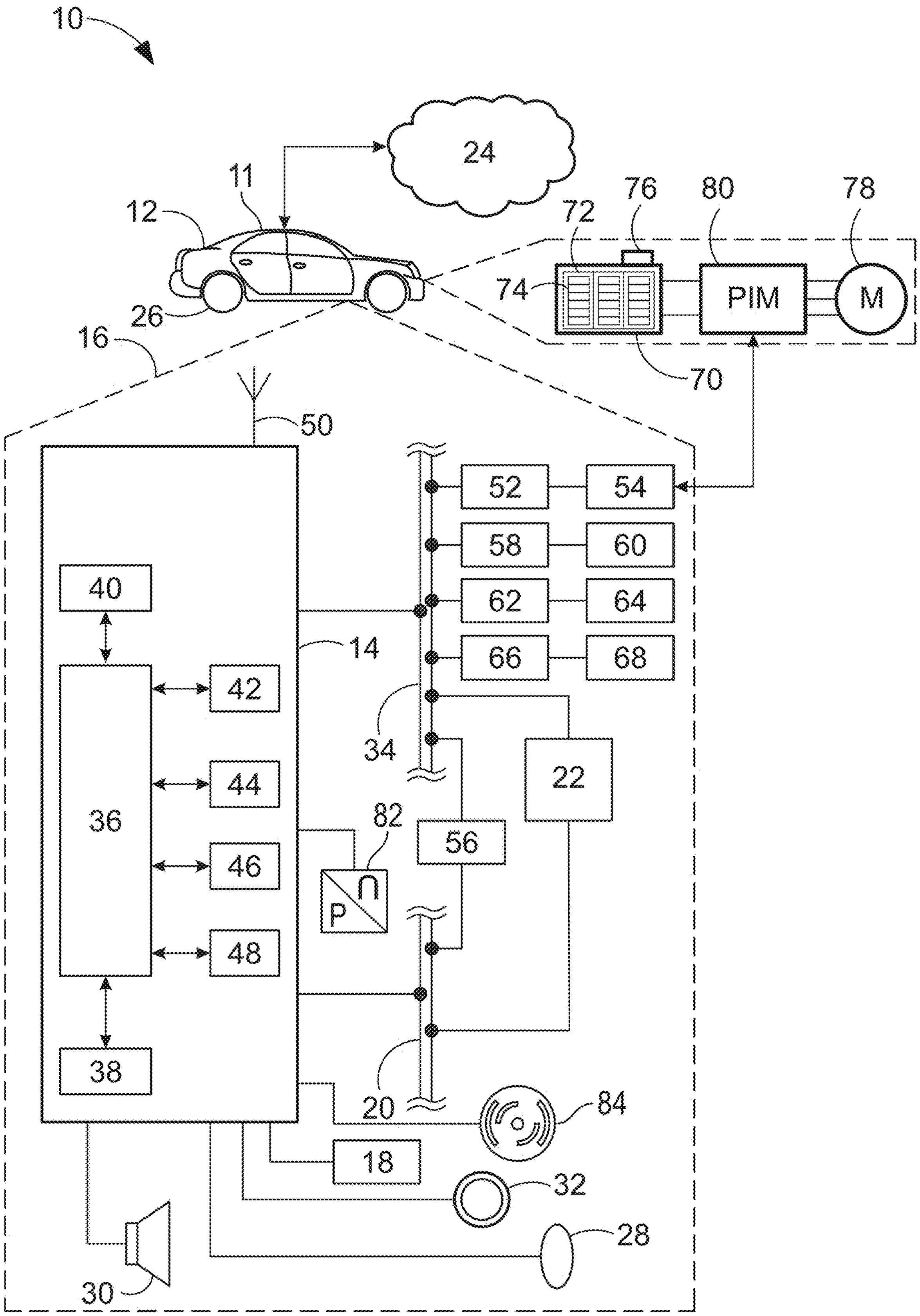
FIG. 1 is a partially schematic, side-view illustration of a representative motor vehicle with a smart parking system and a network of in-vehicle controllers, sensors, and communication devices for provisioning vehicle-assisted occupant egress in accord with aspects of the present disclosure.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles "a" and "an" should generally be construed as meaning "one or more"); the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, utilization of the present concepts for enabling vehicle-assisted occupant egress for a host vehicle parked side-to-side in an uncovered parking lot should be appreciated as a non-limiting implementation of disclosed features. As such, it will be understood that aspects of this disclosure may be employed for other parking scenarios (e.g., angled parking, parallel parking, etc.), implemented for other parking locations (e.g., parking garage, street parking, etc.), and utilized for any logically relevant type of motor vehicle. Moreover, only select components of the motor vehicle are shown and described in detail herein. Nevertheless, the vehicle discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located cloud computing host service 24 (e.g., ONSTAR®). Some of the other vehicle hardware components 16 shown generally in FIG. 1 include, as non-limiting examples, an electronic video display device 18, a microphone 28, audio speaker(s) 30, and assorted user input controls 32 (e.g., buttons, knobs, switches, touchpads, touchscreens, etc.). These hardware components 16 function, in part, as a human/machine interface (HMI) that enables a user to communicate with the telematics unit 14 and other components resident to and remote from the vehicle 10. Microphone 28, for instance, provides occupants with a means to input verbal commands; the vehicle 10 may be equipped with an embedded voice-processing unit utilizing audio filtering, editing, and analysis modules. Conversely, the speaker 30 provides audible output to a vehicle occupant and may be either a stand-alone speaker dedicated of the telematics unit 14 or may be part of an in-cabin audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include twisted pair/fiber optic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, a Motor Control Module (MCM) 56, an Engine Control Module (ECM) 58, a Sensor System Interface Module (SSIM) 60, and assorted other vehicle ECUs, such as a Transmission Control Module (TCM), a Body Control Module (BCM), a Brake System Control Module (BSCM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), a wireless modem, or a mobile hotspot, all of which are collectively represented at 44. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system, e.g., Vehicle-to-Infrastructure (V2I), Vehicle-to-Pedestrian (V2P), Vehicle-to-Device (V2D), Vehicle-to-Cloud (V2C), etc.

CPU 36 receives sensor data from one or more sensing devices that use, for example, photo detection, radar, laser, ultrasonic, optical, infrared, or other suitable technology, including short range communications technologies (e.g., DSRC) or Ultra-Wide Band (UWB) radio technologies, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. Each digital camera 62 may use a charge coupled device (CCD) or other suitable optical sensor to generate images indicative of a field of view of the vehicle 10, and may be configured for continuous image generation, e.g., at least about 55 images per second. In comparison, each range sensor 64 may detect reflected radio, electromagnetic, or light-based waves (e.g., radar, LiDAR, etc.) to detect, for example, the presence, geometric dimensions, and/or proximity of a target object. Each vehicle speed sensor(s) 66 may be in the nature of a mechanical or electromagnetic transmission shaft sensor or electronic wheel speed sensor for detecting vehicle speed. The vehicle dynamics sensor(s) 68 may include a single or triple-axis accelerometer, an angular rate sensor, an inclinometer, a brake pedal sensor, etc. The type, placement, number, and interoperability of the distributed array of in-vehicle sensors may be adapted, singly or collectively, to a given vehicle platform for achieving a desired level of automated vehicle operation.

To propel the automobile 10, a vehicle powertrain is operable to generate and deliver tractive torque to one or more of the vehicle's drive wheels 26. The powertrain is represented in FIG. 1 by an electric traction motor (M) 78 that is operatively connected to a rechargeable energy storage system (RESS), which may be in the nature of a chassis-mounted traction battery pack 70. The traction battery pack 70 is generally composed of one or more battery modules 72 each containing a cluster of battery cells 74, such as lithium-class, zinc-class, nickel-class, or organosilicon-class cells of the pouch, prismatic, or cylindrical type. One or more prime movers, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables on-module management, cell sensing, etc.

During normal operation of the motor vehicle 10, a driver may pull the vehicle into a parking spot and then idle the vehicle, shift the vehicle into park, and/or key-off the vehicle (collectively "park"). When parked, an occupant of the vehicle's passenger cabin 11—be it the driver, front passenger, rear passenger, etc.—may wish to exit the subject "host"

vehicle 10. Exiting the passenger cabin 11 after the host vehicle 10 is parked may be detrimental to the occupant when a third-party "target" vehicle is attempting to park in an adjoining spot next to the vehicle 10. Due to limited visibility or driver carelessness, the target vehicle may not be aware that one of the host vehicle's doors is open or an occupant is alighting from the host vehicle. Presented below are smart parking systems with control logic for providing vehicle-assisted occupant egress by employing a multistep control protocol to predict if a scenario similar to foregoing situation is likely to happen. The host vehicle confirms when it is parked, assesses if an adjoining parking spot is open, detects a target vehicle approaching that open spot, estimates when an occupant will open their vehicle door and/or exit the vehicle, and mitigates the risk to the occupant via infotainment alerts, dynamic camera/sensor activation, automated door lock control, V2V exchanges, etc.

A smart parking system may use a combination of radar and camera data to determine if there is an empty parking space adjacent to the host vehicle. When an empty space is identified, the smart parking system may compare that information with seat occupancy data to determine if there is a risk of an occupant alighting into the open spot. By way of example, if the vehicle is shifted into park or keyed off and the vehicle system detects an empty space on the driver's side, then this first logic check would be true. However, if the vehicle does not sense an empty space on the driver's side, this logic check would be false. As a point of comparison, if the parked vehicle is idling, the front passenger seat is occupied, and the vehicle system detects an empty space on the passenger side of the vehicle, then the first logic check would also be true. If no empty spots are detected or no occupant is seated adjacent an empty spot, the control protocol may automatically exit.

If the first logic check is true, then the smart parking system may retrieve stored data to better determine when an occupant of a parked vehicle adjacent an empty space will open their door. The host vehicle, for example, may retrieve historical behavior data indicating an average time of egress for an occupant (e.g., driver historically waits approximately 48 seconds after PRNDL knob shifted into park to exit vehicle). The host vehicle may also use real-time geolocation data to determine the host vehicle's current location and derive therefrom a type of parking location with associated egress data. For instance, the host vehicle may be parked at an office building where user's historically take longer to exit their vehicle in order to collect personal belongings, or the host vehicle may be parked at a coffee shop where user's historically exit their vehicle quickly to grab a takeout order. Occupant age may also be used to help predict how long it will take to egress the vehicle (e.g., facial recognition used to determine approximate age bracket, seat sensors used to determine if occupant is an adult, a young teenager, or an infant/toddler, etc.). The smart parking system may also use supplemental information to predict a time to egress, such as if an occupant had previously stored an item in their truck bed and were likely to open the tailgate to retrieve that item. Other supplemental information may include determining if there is a Diagnostic Trouble Code (DTC), low washer fluid level, etc., that may necessitate opening the engine bay hood, determining where the host vehicle's charging port is located, etc.

Using the predicted time of egress for each vehicle occupant seated adjacent an empty parking space, the smart parking system determines whether or not there is a likelihood of an incident; if so, the system automates a series of preventative actions to preclude occupant egress and/or stop the target vehicle. The vehicle's telematics unit, digital instrument cluster, car horn, and/or audio system may output audio and visual alerts to alert the occupant a target vehicle is approaching. The smart parking system may activate the car horn, exterior light systems, and/or V2V data exchange to alert the driver of the approaching target vehicle about the likely obstruction. For at least some implementations, the smart parking system may also monitor if an exited occupant remains standing next to the host vehicle and haven't cleared a predefined hazard zone yet. If dark ambient conditions are present, the smart parking system may activate side mirror and underbody lights to illuminate the location of each exiting occupant.

Figure 2:
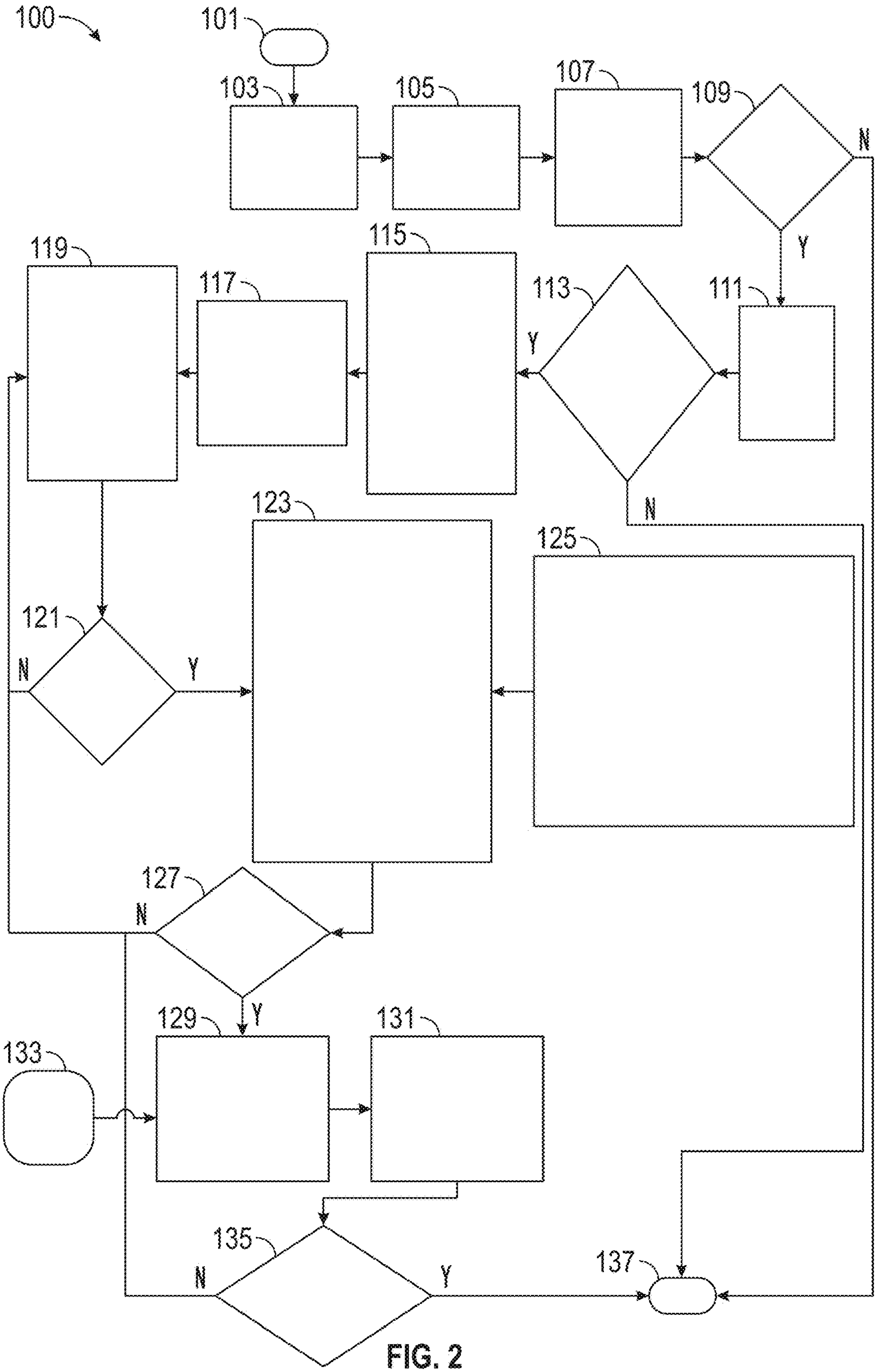
FIG. 2 is a flowchart illustrating a representative host vehicle control protocol for providing vehicle-assisted occupant egress, which may correspond to non-transient, memory-stored instructions that are executable by a resident or remote microprocessor, control module, programmable logic circuit, central controller, or other integrated circuit (IC) device or network of controllers/processors/modules/devices/etc. (collectively "controller") in accordance with aspects of the disclosed concepts.

With reference next to the flowchart of FIG. 2, an improved method or control protocol for operating a smart parking system of a motor vehicle, such as automobile 10 of FIG. 1, is generally described at 100 in accordance with aspects of the present disclosure. Some or all of the operations illustrated in FIG. 2 and described in further detail below may be representative of an algorithm that corresponds to non-transitory, processor-executable instructions that may be stored, for example, in main or auxiliary or remote memory (e.g., resident vehicle memory device(s) 38 and/or remote cloud host service 24 database of FIG. 1). These instructions may be executed, for example, by a microprocessor, central controller, dedicated control module, programmable logic circuit, or other module or device or network of controllers/modules/devices (e.g., vehicle CPU 36 and/or back-office (BO) server-class computer terminal of cloud host service 24) to perform any or all of the above and below described functions associated with the disclosed concepts. It should be recognized that the order of execution of the illustrated operation blocks may be changed, additional operation blocks may be added, and some of the herein described operations may be modified, combined, or eliminated.

Method 100 may begin at START terminal block 101 of FIG. 2 with memory-stored, computer-readable instructions for initializing a vehicle-assisted occupant egress control protocol for a motor vehicle. This routine may be initialized in real-time, near real-time, continuously, systematically, sporadically, and/or at predefined time intervals, for example, each 10 or 100 milliseconds during operation of the motor vehicle 10. As yet another option, terminal block 101 may initialize responsive to a user command prompt (e.g., via telematics input controls 28, 32), a resident vehicle controller prompt (e.g., from CPU 36), or a broadcast prompt signal received from a centralized BO vehicle services system (e.g., from cloud host service 24). In one example, method 100 may automatically initialize responsive to detection of the host vehicle's current speed dropping below a baseline vehicle speed (e.g., ~10 miles per hour (mph)) indicating the vehicle is likely coming to a stop. Upon completion of some or all of the control operations presented in FIG. 2, method 100 may advance to END terminal block 137 and temporarily terminate or, optionally, may loop back to terminal block 101 and run in a continuous loop (e.g., until no vehicle occupants are detected or a predefined time period has lapsed).

From terminal block 101, method 100 may advance to HOST PARKED process block 103 to confirm that the host vehicle is parked. A vehicle controller, such as CPU 36 of FIG. 1, may communicate with one or more of the resident vehicle dynamics sensors (e.g., speed sensors 66 and dynamics sensors 68) to confirm that the host vehicle has come to a stop. The vehicle controller may also communicate with one or more of the vehicle control modules (e.g., PCM 52, MCM 56, ECM 58, etc.) to confirm that the host vehicle has been shifted into park and/or has been shut down. In tandem, the vehicle controller may use geolocation data to determine a real-time vehicle location, which may then be overlayed onto an open-source street map to confirm that the vehicle is parked in a parking lot or parking garage with multiple side-by-side parking spots (as opposed to stopped at a stop light or parked in a home garage).

Figures 3A, 3B, 3C, 3D:
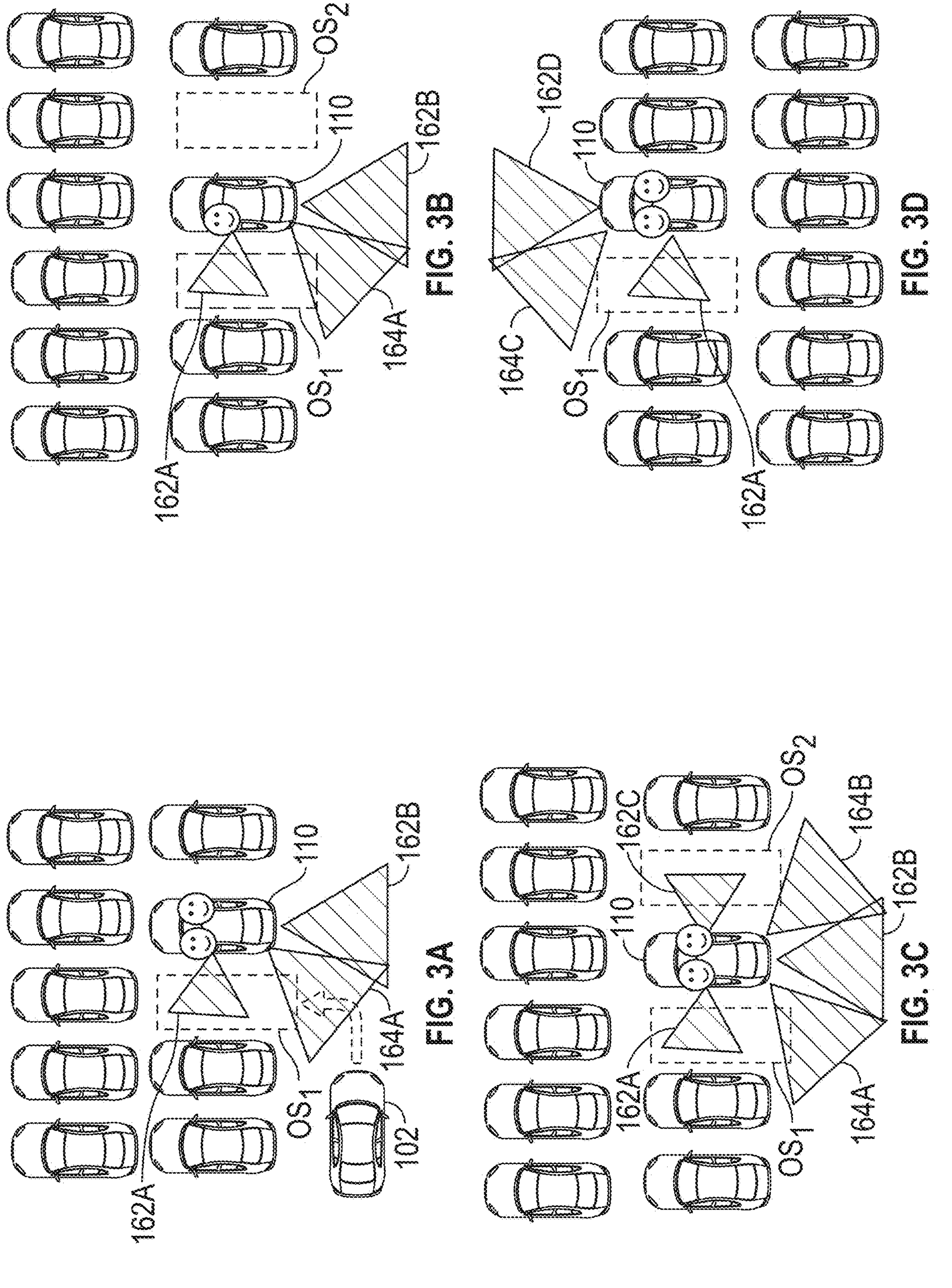
FIGS. 3A-3D are plan-view illustrations of a representative host vehicle with different occupancy conditions and stopped in various parking scenarios triggering distinct camera and sensor activation logic in accordance with aspects of the disclosed concepts.

After confirming the host vehicle is parked, method 100 may responsively activate the on-vehicle sensor farm to evaluate the immediate surrounding area of the vehicle. At EXTERNAL SENSOR data input block 105, for example, the vehicle CPU 36 may activate port-side and starboard-side sensing devices, such as sideview mirror-mounted digital cameras 62 and quarter panel-mounted range sensor 64. Once activated, method 100 may execute SENSOR DATA ANALYSIS subroutine 107 and evaluates the real-time sensor data received from the vehicle sensor array to determine if there are open spots adjacent the port and starboard lateral sides of the host vehicle. Method 100 may concomitantly execute OPEN SPACE decision block 109 to determine if an open space is detected. In FIGS. 3A and 3D, for example, a port-side (first) open spot $OS_1$ is detected on a left-hand driver side of a host vehicle 110. FIGS. 3B and 3C, in contrast, illustrate port-side (first) and starboard-side (second) open spots $OS_1$ and $OS_2$ are respectively detected on the left-hand driver side and right-hand passenger side of the host vehicle 110. If an open space is not detected on either side of the host vehicle (Block 109=NO), method 100 may responsively proceed to terminal block 137 and temporarily terminate.

When an open space is detected on one or both lateral sides of the host vehicle (Block 109=YES), method 100 may respond by executing OCCUPANT SEATING ANALYSIS subroutine 111 to establish a current state of occupancy of the host vehicle. Continuing with the example of FIG. 1, the vehicle CPU 36 may query a driver seat-mounted (first) pressure sensor 82 and concomitantly analyze pressure sensor data received therefrom to determine if the driver seat is occupied. Likewise, the vehicle CPU 36 may query one or more passenger seat-mounted (second) pressure sensors 82 and concomitantly analyze pressure sensor data received therefrom to determine if any of the passenger seats are occupied. To reduce computational load and processing time, the method 100 may only evaluate passenger seats that are immediately adjacent a detected open spot. In the scenario illustrated in FIG. 3A, for example, the CPU 36 may only evaluate the driver seat and the driver-side rear passenger seat. Moving to OCCUPANT SEATING decision block 113, method 100 may then determine whether or not there is an occupant seated in a vehicle seat that exits the host vehicle through a respective vehicle door into a detected open spot. If there are no occupants seated immediately adjacent an open spot (Block 113=NO), method 100 may responsively proceed to terminal block 137 and temporarily terminate.

Upon detecting at least one occupant in at least one vehicle seat exiting the passenger cabin into at least one open spot adjacent the parked host vehicle (Block 113=YES), method 100 may responsively execute SENSOR SELECTION process block 115 to select a respective subset of the on-vehicle sensors that will be assigned to each occupied vehicle seat exiting into an open spot. By way of example, and not limitation, vehicle CPU 36 of FIG. 1 may determine which camera or cameras and which range sensor or sensors to activate based on the detected open space data, assessed occupancy data, and vehicle parking orientation data. Once selected, method 100 may concurrently execute SENSOR ACTIVATION process block 117 and activates each selected subset of sensor farm sensors. At the same time, the in-vehicle centerstack telematics unit, such as telematics unit 14 of FIG. 1, may display the digital images captured by one or more of the activated vehicle cameras, e.g., to show approaching or passing third-party vehicles.

Representative implementations of process blocks 115 and 117 may be found in the examples illustrated in FIGS. 3A-3D of the drawings. FIG. 3A, for example, portrays both the driver seat and front passenger seat as being occupied; however, only one open spot $OS_1$ is detected on the port side of the host vehicle 110. In this scenario, the CPU 36 may select and activate: (1) a driver-side, sideview-mirror mounted "surround view" camera 162A, (2) a trunk-lid mounted "backup" camera 162B, and (3) a driver-side, quarter panel-mounted "blind spot" radar sensor 164A. As a point of contrast, FIG. 3B shows that there are open spots $OS_1$, $OS_2$ detected on both lateral sides of the host vehicle 110; however, only the driver seat is occupied. In this scenario, the CPU 36 may select and activate the same three sensors as in FIG. 3A, namely the surround view camera 162A, backup camera 162B, and blind spot radar sensor 164A, since there is no occupant seated in either the front or rear passenger-side seats exiting into the starboard-side open spot $OS_2$.

FIG. 3C, on the other hand, senses that both the driver seat and front passenger seat are occupied and detects open spots $OS_1$, $OS_2$ on both lateral sides of the host vehicle 110. In this scenario, the CPU 36 may select and activate: (1) the driver-side surround view camera 162A, (2) a passenger-side, sideview-mirror mounted "surround view" camera 162C, (3) the backup camera 162B, (4) the driver-side blind spot radar sensor 164A, and (5) a passenger-side, quarter panel-mounted "blind spot" radar sensor 164B. The sensors selected for an occupied vehicle seat exiting into an open spot may differ for parking scenarios in which the host vehicle 110 was backed into an available spot. For comparative purposes, both FIGS. 3A and 3D show the driver seat and front passenger seat as being occupied while only one open spot $OS_1$ is detected on the port side of the host vehicle 110. When juxtaposing FIG. 3A, in which the host vehicle 110 is parked nose in, to FIG. 3D, in which the host vehicle 110 is parked tail in, the CPU 36 in FIG. 3D may select and activate: (1) the driver-side surround view camera 162A, (2) a front-facia mounted "park assist" camera 162D, and (3) a driver-side, front fender-mounted "cross traffic" radar sensor 164C.

After selecting and activating a select subset of the on-vehicle sensors for each occupied vehicle seat or seats exiting into an open spot, method 100 may execute TARGET ACQUISITION data input block 119 to monitor the host vehicle's contiguous vicinity for a target vehicle approaching an adjoining open spot. In FIG. 3A, for example, the vehicle CPU 36 of host vehicle 110 may evaluate real-time sensor data generated by the three selected and activated sensing devices 162A, 162B, and 164A, as well as V2V and V2I data exchanges, to target passing third-party vehicles. Once identified, a target vehicle 102 may be tracked to determine if that vehicle is approaching and intending to enter the port-side open spot $OS_1$, as indicated at TARGET PARKING decision block 121. If the detected target vehicle 102 is not approaching/entering the open spot $OS_1$ (Block 121=NO), method 100 may loop back to data input block 119 and run in a continuous loop until a target vehicle does approach the open spot, the passenger cabin 11 is vacated, or a predefined loop exit (timeout) is realized.

If a target vehicle is approaching/entering a risk-prone open spot (Block 121=YES), method 100 may responsively trigger EGRESS CALCULATION subroutine 123 and conduct an egress probability evaluation to predict the likelihood that an occupant will exit into that risk-laden spot while the target vehicle breaches the spot. For FIG. 3A, the vehicle CPU 36 may evaluate occupant, vehicle, and location-specific data to predict a probability of egress indicating a likelihood of the driver exiting the host vehicle 110 into the adjoining open spot $OS_1$ while the target vehicle 102 is entering that open spot $OS_1$. To conduct the foregoing evaluation, method 100 may execute EGRESS INFORMATION database storage block 125 and retrieve the following information:

(1) a total time since the host vehicle was parked (e.g., RTC 42 monitored time that has lapsed after PRNDL knob shifted into park);

(2) a behavior profile of an exiting occupant (e.g., profile of average time driver typically sits after PRNDL knob shifted into park)

(3) an activity level of a location where the host vehicle is parked (e.g., high-activity location with avg. fast egress vs. low-activity location with avg. slow egress);

(4) an age of an exiting occupant (e.g., infant/toddler vs. child vs. teen vs. young adult vs. middle-aged adult vs. late adulthood vs. senior citizen);

(5) placement of objects stowed in the host vehicle (e.g., driver has placed personal items in the front or rear passenger seat that need to be collected prior to egress);

(6) charge level and charge port location of the host vehicle (i.e., for full-electric or hybrid-electric vehicles); and/or (7) a phone call status (e.g., is driver on an active phone call after parking).

It is envisioned that additional or alternative information may be collected and analyzed to conduct the egress probability evaluation.

EGRESS CALCULATION subroutine 123 may use any or all of the information collected from data input block 125 to compute an egress probability score for each occupant exiting into an open spot. For instance, if the total time since the host vehicle was parked exceeds an average idle occupant time (e.g., occupants historically wait roughly 35 seconds after PRNDL knob shifted into park to exit vehicle), seven (7) points are added to the egress probability score. If the host vehicle is parked in a high-activity level location, three (3) points are added to the egress probability score. If an exiting occupant's behavior profile indicates that occupant is exiting soon, eight (8) points are added to the egress probability score. If an exiting occupant's age is greater than a predefined age threshold, two (2) points are subtracted from their egress probability score. If an exiting occupant's age is less than a predefined age baseline, two (2) points are added to their egress probability score.

Advancing from EGRESS CALCULATION subroutine 123 to EGRESS ESTIMATION decision block 127, method 100 may determine whether or not an occupant's probability of egress (i.e., egress probability score) exceeds a preset threshold egress value. This threshold egress value may be set by the manufacturer and, if desired, may be selectively increased or decreased by a vehicle owner or driver for increased or decreased protection. Method 100 may respond to the occupant's probability of egress not exceeding the threshold egress value (Block 127=NO) by looping back to decision block 109, data input block 119, or decision block 121. Upon determining that the occupant's probability of egress exceeds the threshold egress value (Block 127=YES), method 100 may responsively execute OCCUPANT ALERT system output block 129 and alert an egressing occupant of the oncoming target vehicle. In tandem, method 100 may also execute DRIVER ALERT system output block 131 and alert the driver of the host vehicle 110 and/or the driver of the oncoming target vehicle 102 of the egressing occupant. In accord with the illustrated example, the alerts generated at system output blocks 129 and 131 may be terminated in response to receipt of a system interrupt signal (e.g., vehicle door opened) at ALERT INTERRUPT data input block 133.

Alerting an occupant of a target vehicle entering a risk-laden spot adjacent the parked host vehicle may include the vehicle controller commanding one or more resident vehicle subsystems to execute one or more remediating actions designed to prevent the occupant from exiting the passenger cabin into that open spot. Vehicle CPU 36 of FIG. 1, for example, may activate and selectively modulate a haptic transducer 84 mounted to one or more of the in-cabin vehicle seats. In this instance, the remediating action may include a haptic transducer 84 outputting a predefined haptic alert to an occupant of a vehicle seat. As another option, the vehicle CPU 36 may selectively activate any one or more of the output devices of the centerstack telematics unit 14 mounted inside the passenger cabin 11. In this instance, the remediating action may include the telematics unit's audio speaker(s) 30 outputting a predefined audible and/or the telematics unit's video display device 18 outputting a predefined visual alert to occupants of the passenger cabin 11. As yet another option, the resident vehicle subsystem may include a power door lock packaged within the corresponding vehicle door of the exiting occupant. In this instance, the remediating action may include the CPU 36 commanding the power door lock to lock the occupant's vehicle door while the target vehicle enters the open spot. At HAZARD ZONE decision block 135, method 100 may determine whether or not an exiting occupant has cleared a predefined hazard zone; if not (Block 135=NO), method 100 may responsively loop back to process blocks 119 and/or 131. If the exiting occupant has cleared the predefined hazard zone (Block 135=YES), method 100 may advance to terminal block 137 and terminate.

For at least some intended applications, the smart parking systems may use Global Navigation Satellite System (GNSS) data to determine a real-time vehicle location and orientation of the host vehicle. The smart parking system may also use an occupant's accessibility needs information to predict when and how long egress will take for that occupant. An infant/toddler car seat detection protocol may be used to help predict when and how long egress will take for an occupant in the rear of the host vehicle. For at least some applications, the smart parking system may respond to detecting an open vehicle door by transmitting a door open status alert to a target vehicle approaching an open adjoining spot adjacent the host vehicle. Crowdsourced data may be used to help predict how long an occupant will sit in the host vehicle before opening their door. The smart parking system may retrieve and evaluate DTCs to identify faults and malfunctions in the host vehicle and, from this information, predict where a host vehicle is located and when an occupant will exit the vehicle. For electric-drive vehicle configurations, the smart parking system may use a real-time charge level and a charge port location to help predict when and how long an occupant will be in a predefined hazard zone. A host vehicle's external lights may be used to light up areas where an occupant is standing adjacent the host vehicle. The smart parking system may actively monitor for shopping carts, glass, puddles, pot holes, and other similar hazards adjacent the parked host vehicle and, if detected, warn the vehicle occupants and/or incoming target vehicles.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of operating a host vehicle with a passenger cabin having first and second vehicle seats accessed through respective first and second vehicle doors, the method comprising:

determining, via a vehicle controller using vehicle data received from a vehicle dynamics sensor and/or a vehicle control module, the host vehicle is parked;

determining, via the vehicle controller using sensor array data received from a vehicle sensor array of the host vehicle responsive to determining the host vehicle is parked, a vehicle parking spot adjacent the host vehicle is a first open spot adjacent a first lateral side of the host vehicle;

detecting, via the vehicle controller responsive to determining the vehicle parking spot adjacent the host vehicle is the first open spot, a first occupant in the first vehicle seat exiting the host vehicle through the first vehicle door into the first open spot;

activating, via the vehicle controller responsive to detecting the first occupant in the first vehicle seat exiting the host vehicle into the first open spot, a first subset of sensors of the resident sensor array assigned to the first vehicle seat;

detecting, via the vehicle controller using first sensor data received from the first subset of sensors, a first target vehicle approaching the first open spot; and commanding, via the vehicle controller responsive to detecting the first target vehicle approaching the first open spot, a resident vehicle subsystem to execute a remediating action configured to prevent the first occupant from exiting the passenger cabin into the first open spot.

2. The method of claim 1, further comprising:

detecting, via the vehicle controller using the sensor array data received from the vehicle sensor array responsive to determining the host vehicle is parked, a second open spot adjacent a second lateral side, opposite the first lateral side, of the host vehicle;

detecting, via the vehicle controller for the detected second open spot, a second occupant in the second vehicle seat exiting the host vehicle through the second vehicle door into the second open spot; and activating, via the vehicle controller responsive to detecting the second occupant exiting the host vehicle into the second open spot, a second subset of sensors, distinct from the first subset of sensors, of the vehicle sensor array assigned to the second vehicle seat.

3. The method of claim 2, further comprising:

detecting, via the vehicle controller using second sensor data received from the second subset of sensors, a second target vehicle approaching the second open spot; and commanding, via the vehicle controller responsive to detecting the second target vehicle approaching the second open spot, the resident vehicle subsystem to execute a second remediating action configured to prevent the second occupant from exiting the passenger cabin into the second open spot.

4. The method of claim 2, further comprising:

receiving, via the vehicle controller responsive to detecting the first open spot, first pressure sensor data from a first pressure sensor of the first vehicle seat;

analyzing, via the vehicle controller, the first pressure sensor data to determine if the first vehicle seat is occupied;

receiving, via the vehicle controller responsive to detecting the second open spot, second pressure sensor data from a second pressure sensor of the second vehicle seat; and analyzing, via the vehicle controller, the second pressure sensor data to determine if the second vehicle seat is occupied.

5. The method of claim 2, further comprising:

determining, via the vehicle controller responsive to detecting the first occupant in the first vehicle seat, which of a plurality of sensors of the vehicle sensor array is the first subset of sensors that corresponds to the first vehicle seat; and determining, via the vehicle controller responsive to detecting the second occupant in the second vehicle seat, which of the plurality of sensors of the vehicle sensor array is the second subset of sensors that corresponds to the second vehicle seat.

6. The method of claim 1, further comprising:

predicting a probability of egress indicative of a likelihood of the first occupant exiting the host vehicle into the first open spot while the first target vehicle is entering the first open spot; and determining if the probability of egress is greater than a preset threshold egress value, wherein commanding the resident vehicle subsystem to execute the remediating action is further in response to the probability of egress being greater than the preset threshold egress value.

7. The method of claim 6, wherein predicting the probability of egress is based on a total time since the host vehicle was parked, an age of the occupant, an activity level of a location where the host vehicle is parked, and/or a behavior profile of the first occupant.

8. The method of claim 1, further comprising:

activating, via the vehicle controller responsive to determining the host vehicle is parked, first and second lateral proximity or camera sensors of the vehicle sensor array to monitor the first lateral side and a second lateral side of the host vehicle; and receiving, via the vehicle controller, the sensor array data from the first and second lateral proximity or camera sensors.

9. The method of claim 1, wherein the first subset of sensors includes a front or rear vehicle camera capturing digital images of the first target vehicle approaching the first open spot, the method further comprising displaying, via an in-vehicle telematics unit, the captured digital images of the first target vehicle.

10. The method of claim 1, wherein the resident vehicle subsystem includes a haptic transducer mounted to the first vehicle seat, and the remediating action includes the haptic transducer outputting a predefined haptic alert to the first occupant of the first vehicle seat.

11. The method of claim 1, wherein the resident vehicle subsystem includes an infotainment system with a telematics unit and an instrument cluster mounted inside the passenger cabin, and the remediating action includes the infotainment system outputting a predefined audible and/or visual alert to the first occupant of the first vehicle seat.

12. The method of claim 1, wherein the resident vehicle subsystem includes a power door lock attached to the first vehicle door, and the remediating action includes the power door lock locking the first vehicle door while the first target vehicle enters the first open spot.

13. The method of claim 1, wherein;

the vehicle dynamics sensor includes a wheel speed sensor and the vehicle data indicates the host vehicle has stopped; and/or the vehicle control module is a powertrain control module and the vehicle data indicates the host vehicle has shifted into park.

14. A non-transient, computer-readable medium storing instructions executable by a vehicle controller of a host vehicle, the host vehicle including a passenger cabin containing first and second vehicle seats accessed through respective first and second vehicle doors, the instructions, when executed, causing the vehicle controller to perform operations comprising:

determining, using vehicle data received from a vehicle dynamics sensor and/or a vehicle control module, the host vehicle is parked;

determining, using sensor array data received from a vehicle sensor array of the host vehicle responsive to determining the host vehicle is parked, at least one vehicle parking spot adjacent the host vehicle is a first open spot adjacent a first lateral side of the host vehicle and/or a second open spot adjacent a second lateral side of the host vehicle;

detecting, responsive to determining the at least one vehicle parking spot adjacent the host vehicle is the first open spot and/or the second open spot, a first occupant in the first vehicle seat exiting the host vehicle through the first vehicle door into the first open spot and/or a second occupant in the second vehicle seat exiting the host vehicle through the second vehicle door into the second open spot;

activating, via the vehicle controller responsive to detecting the first occupant in the first vehicle seat and/or the second occupant in the second vehicle seat, a first subset of sensors of the vehicle sensor array assigned to the first vehicle seat and/or a second subset of sensors of the vehicle sensor array assigned to the second vehicle seat;

detecting, via the vehicle controller using first sensor data received from the first subset of sensors and/or second sensor data received from the second subset of sensors, a first target vehicle approaching the first open spot and/or a second target vehicle approaching the second open spot; and commanding, via the vehicle controller responsive to detecting the first target vehicle approaching the first open spot and/or the second target vehicle approaching the second open spot, a resident vehicle subsystem of the host vehicle to execute a remediating action configured to prevent the first occupant from exiting the passenger cabin into the first open spot and/or prevent the second occupant from exiting the passenger cabin into the second open spot.

15. A motor vehicle, comprising:

a vehicle body including a passenger cabin;

a plurality of road wheels attached to the vehicle body;

a prime mover attached to the vehicle body and configured to drive one or more of the road wheels to thereby propel the motor vehicle;

first and second vehicle seats located inside the passenger cabin;

first and second vehicle doors movably mounted to the vehicle body to selectively open and thereby provide access to the first and second vehicle seats; and a vehicle controller attached to the vehicle body and programmed to:

determine, using real-time vehicle data received from a vehicle dynamics sensor and/or a vehicle control module, the motor vehicle is parked;

determine, using real-time sensor array data received from a vehicle sensor array of the motor vehicle responsive to determining the motor vehicle is parked, a vehicle parking spot adjacent the motor vehicle is a first open spot adjacent a first lateral side of the motor vehicle;

detect, for responsive to determining the vehicle parking spot adjacent the host vehicle is the detected first open spot, a first occupant in the first vehicle seat exiting the motor vehicle through the first vehicle door into the first open spot;

activate, responsive to detecting the first occupant in the first vehicle seat exiting the motor vehicle into the first open spot, a first subset of sensors of the vehicle sensor array assigned to the first vehicle seat;

detect, using real-time first sensor data received from the first subset of sensors, a first target vehicle approaching the first open spot; and command, responsive to detecting the first target vehicle approaching the first open spot, a resident vehicle subsystem of the motor vehicle to execute a remediating action configured to prevent the first occupant from exiting the passenger cabin into the first open spot.

16. The motor vehicle of claim 15, wherein the vehicle controller is further programmed to:

predict a probability of egress indicative of a likelihood of the first occupant exiting the motor vehicle into the first open spot as the first target vehicle enters the first open spot; and determine if the probability of egress is greater than a preset threshold egress value, wherein commanding the resident vehicle subsystem to execute the remediating action is further in response to the probability of egress being greater than the preset threshold egress value.

17. The motor vehicle of claim 15, wherein the vehicle controller is further programmed to:

activate, responsive to determining the motor vehicle is parked, first and second lateral proximity or camera sensors of the vehicle sensor array to monitor the first lateral side and a second lateral side of the motor vehicle; and receive the real-time sensor array data from the first and second lateral proximity or camera sensors.

18. The motor vehicle of claim 15, wherein the resident vehicle subsystem includes a haptic transducer mounted to the first vehicle seat, and the remediating action includes the haptic transducer outputting a predefined haptic alert to the first occupant of the first vehicle seat.

19. The motor vehicle of claim 15, wherein the resident vehicle subsystem includes an infotainment system with a telematics unit and an instrument cluster mounted inside the passenger cabin, and the remediating action includes the infotainment system outputting a predefined audible and/or visual alert to the first occupant of the first vehicle seat.

20. The motor vehicle of claim 15, wherein the resident vehicle subsystem includes a power door lock attached to the first vehicle door, and the remediating action includes the power door lock locking the first vehicle door while the first target vehicle enters the first open spot.

* * * * *